(12) United States Patent
Plush et al.

(10) Patent No.: US 6,532,282 B1
(45) Date of Patent: Mar. 11, 2003

(54) METHOD AND SYSTEM FOR ACCUMULATING CALL PREPAYMENT

(75) Inventors: Christopher Plush, Oxfordshire; Mark Wren, Devon, both of (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

(21) Appl. No.: 09/601,859

(22) PCT Filed: Feb. 5, 1999

(86) PCT No.: PCT/GB99/00372
§ 371 (c)(1),
(2), (4) Date: Nov. 16, 2000

(87) PCT Pub. No.: WO99/40717
PCT Pub. Date: Aug. 12, 1999

(30) Foreign Application Priority Data

Feb. 6, 1998 (GB) ............................................. 9802636

(51) Int. Cl.$^7$ ...................... H04M 15/06; H04M 17/00; H04M 11/00
(52) U.S. Cl. ............................ 379/114.03; 379/114.01; 379/114.1; 379/114.17; 379/121.02; 379/144.01; 455/406; 455/408
(58) Field of Search .......................... 379/111, 112.01, 379/114.01, 114.1, 114.12, 114.15, 114.17, 114.2, 114.28, 144.01, 121.02, 133, 201.01; 455/405, 406, 407, 408

(56) References Cited

U.S. PATENT DOCUMENTS

| | | | | |
|---|---|---|---|---|
| 5,592,537 A | * | 1/1997 | Moen | 379/112.01 |
| 5,983,091 A | * | 11/1999 | Rodriquez | 455/405 |
| 6,009,156 A | * | 12/1999 | Cross | 379/144 |
| 6,044,258 A | * | 3/2000 | Abdella | 455/405 |
| 6,122,354 A | * | 9/2000 | Dowens | 379/144 |
| 6,173,171 B1 | * | 1/2001 | Plush et al. | 455/408 |
| 6,226,364 B1 | * | 5/2001 | O'Neil | 379/112.01 |

FOREIGN PATENT DOCUMENTS

| | | |
|---|---|---|
| EP | 0 698 987 | 8/1995 |
| GB | 2 171 877 A | 9/1986 |
| GB | 2 213 744 A | 12/1997 |

* cited by examiner

Primary Examiner—Curtis Kuntz
Assistant Examiner—Quoc Tran
(74) Attorney, Agent, or Firm—Knobbe, Martens, Olson & Bear, LLP

(57) ABSTRACT

Subscribers in a mobile communications system are provided with a bundle of call time each billing period, against which standard call types are rated. If, at the end of one billing period, a portion of the bundle for that billing period remains, the rating system associates the remaining portion with a bundle provided for the forthcoming billing period. In one embodiment, rating is interrupted whilst any remaining portions of the previous bundles are added to the newly-created bundles for the next period. In other embodiments, the rating system refers both to the current bundle and to a previous bundle when rating standard call types.

22 Claims, 13 Drawing Sheets

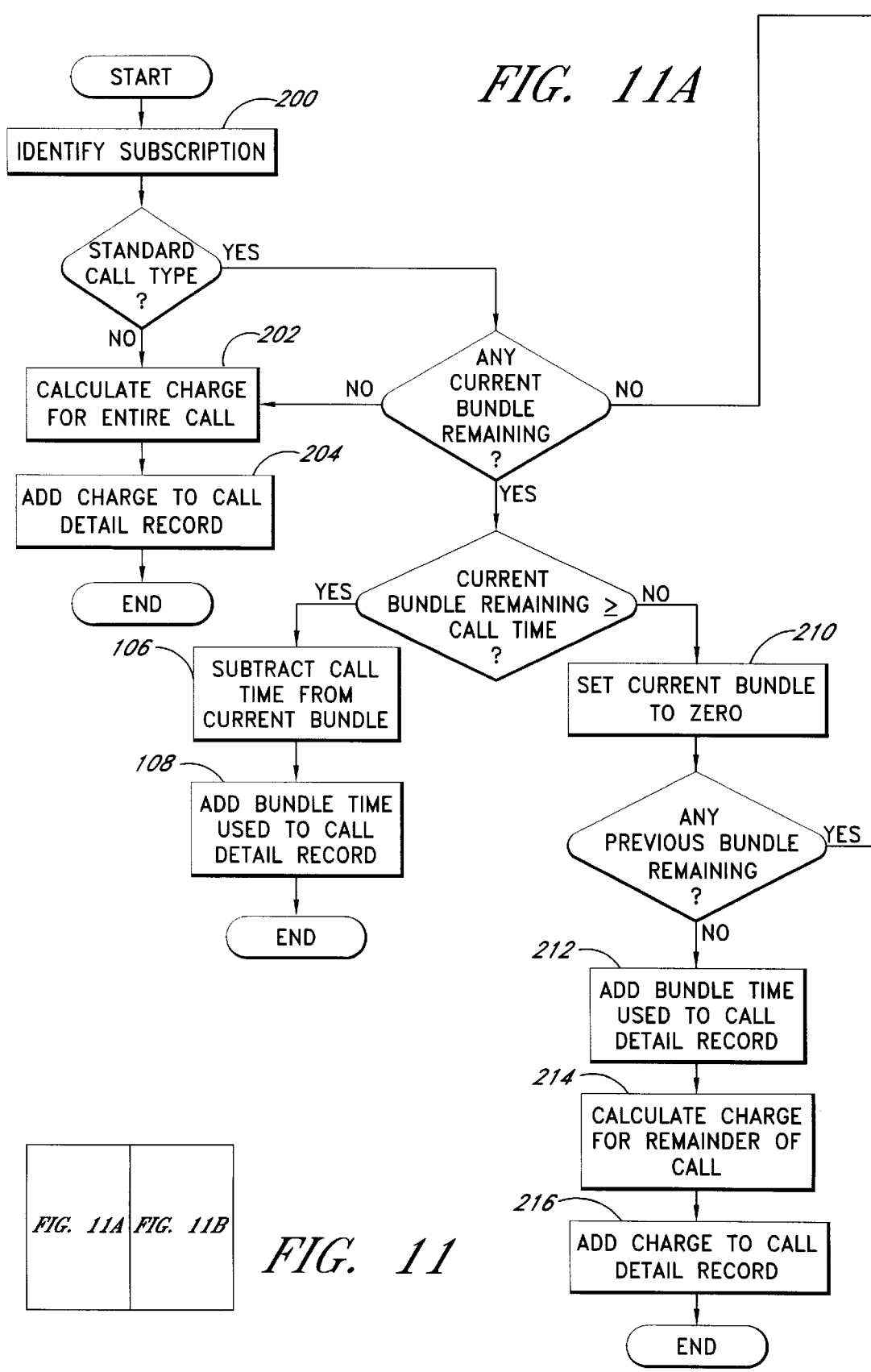

METHOD AND SYSTEM FOR ACCUMULATING CALL PREPAYMENT

FIELD OF THE INVENTION

This invention relates to telecommunications and in particular apparatus and methods for processing service usage by subscribers in a telecommunications system.

BACKGROUND OF THE INVENTION

It is known, in relation to mobile communications systems, to provide a type of subscription for which subscribers are allocated a "bundle" of call time at the beginning of each billing period, for use during the following billing period. Calls made during the following billing period, which fall within a standard call type category are rated against the bundle, rather than being charged for individually. Whenever a call is rated against a subscriber's bundle, the amount remaining of the bundle is decremented, and after the entire bundle has been used, all calls are rated according to predetermined tariffs and charged for individually.

Each bundle is valid only for a single billing period. At the start of the next billing period, another bundle is created for use during the subsequent billing period.

SUMMARY OF THE INVENTION

In accordance with one aspect of the present invention there is provided call record processing apparatus for a telecommunications system, said apparatus comprising:
  an input data link for receiving call records generated in the telecommunications system;
  a store for user allocation records, said user allocation records being capable of holding first allocations of usage associated with first predetermined usage criteria and second allocations of usage associated with second predetermined usage criteria, at least one criterion of which is different to any of said first criteria,
  a call record processor arranged to cumulatively reduce one of said first allocations for call records holding call details satisfying said first criteria, and to cumulatively reduce one of said second allocations for call records holding call details satisfying said second criteria,
  wherein said apparatus is arranged to associate said first allocations with said second allocations so as to allow said call record processor to reduce one of said first allocations for call records holding call details satisfying said second criteria.

Thus, this aspect of the invention allows for flexibility in use of the different allocations of usage. For example, where the first allocations of usage are valid for a notional period of currency which is different to a notional period of currency for the second allocations of usage, the first allocations of usage may be associated with the second allocations when portions of the first allocations remain at the end of their respective period of currencies, to enable full usage of the first allocations nevertheless.

In accordance with a second aspect of the invention there is provided service usage processing apparatus for a telecommunications system, said apparatus comprising:
  a store holding user records; and
  a service usage processor,
  said apparatus being arranged to associate a predetermined allocation of usage with a user record, at the start of each of a plurality of consecutive usage periods, said allocation having a defined period of currency corresponding to the following usage period, such that a first allocation is associated with a user record for a first usage period and a second allocation is associated with said user record for a second usage period,
  said service usage processor being arranged to reduce said first allocation for service usage defined to occur within said first usage period, and to reduce said second allocation for service usage defined to occur within said second usage period,
  wherein said service usage processor is arranged to reduce said first allocation for service usage defined to occur within said second usage period, if at least a portion of said first allocation remains after the end of said first usage period.

The advantage of this arrangement will be apparent from the above discussions.

In accordance with a further aspect of the invention there is provided a method of operating a rating apparatus in a telecommunications system, said method comprising the following steps:
  (i) defining, for subscriptions in the system, first usage allocations to be applied by said apparatus to service usage during a first usage period, and second usage allocations to be applied by said apparatus, during a second usage period;
  (ii) rating usage records during said first usage period, reducing said first usage allocations for predefined usage types;
  (iii) interrupting rating after the end of said first usage period; and
  (iv) adding remaining usage from said first allocations to said second allocations whilst call rating is interrupted.

This aspect of the invention provides a method whereby remaining portions of the first allocations may be carried over to the second usage period, whilst rating need only refer to a single usage allocation in any usage period.

In accordance with a further aspect of the invention there is provided a method of operating a rating apparatus in a telecommunications system, said method comprising the following steps:
  (i) defining, for subscriptions in the system, first usage allocations to be applied by said apparatus to service usage during a first usage period, and second usage allocations to be applied by said apparatus during a second usage period;
  (ii) rating usage records detailing usage defined to occur during said first usage period against said first usage allocations; and
  (iii) rating usage records detailing usage defined to occur during said second usage period against both said first and said second usage allocations.

This aspect provides a method whereby portions of the first usage allocations remaining after the end of the first usage period may be utilised nevertheless, without the need to interrupt ratings.

BRIEF DESCRIPTION OF THE DRAWINGS

Further advantages and features of the invention will be apparent from the following description of preferred embodiments of the invention, described with reference to the accompanying diagrams, wherein.

DETAILED DESCRIPTION OF THE INVENTION

Figure 1:
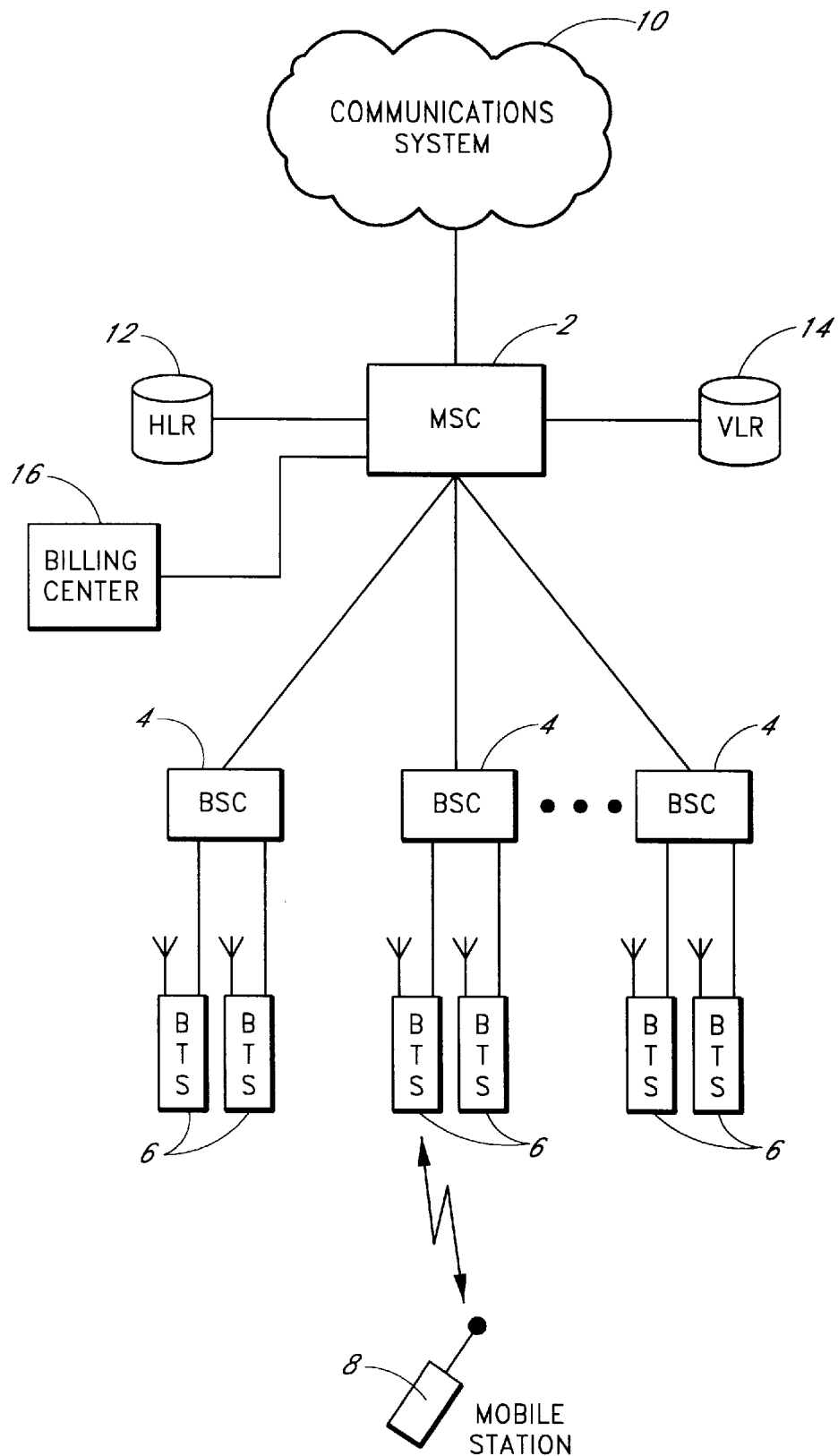
FIG. 1 is a block diagram schematically illustrating a mobile communications network.

FIG. 1 shows a cellular communications network, such as a GSM network, which is in itself known and will not be described in detail. A mobile switching centre (MSC) 2 is connected via communications links to a number of base station controllers (BSCs) 4. The BSCs 4 are dispersed geographically across areas served by the MSC 2. Each BSC 4 controls one or more base transceiver stations (BTSs) 6 located remote from, and connected by further communications links to, the BSC. Each BTS 6 transmits radio signals to, and receives radio signals from, mobile stations 8 which are in an area served by that BTS. That area is referred to as a "cell". A mobile communications network is provided with a large number of such cells, which are ideally contiguous to provide continuous coverage over the whole network territory.

The MSC 2 is also connected via communications links to other MSCs, which are not illustrated, in the remainder of the communications system 10, and to a public services telephone network (PSTN), ISDN lines, etc, which are not illustrated. The MSC is provided with a home location register (HLR) 12 which is a database storing subscriber authentication data, and a visitor location register (VLR) 14 which is a database temporarily storing subscriber authentication data for mobile stations active in its area.

When the user of the mobile station 8 utilises a telecommunications service provided by the mobile communications network, for example by initiating a voice call, sending a fax, sending data, sending text messages, or retrieving voicemail, etc, a call detail record is generated in the serving MSC. Call detail records are collected in the MSCs and sent in batches to a Network Mediation System, which is not illustrated, and after selecting and reformatting, to a billing centre 16.

A call detail record includes, amongst other information, the international mobile subscriber identity (IMSI) and the telephone directory number (MSISDN) used for the call, along with data allowing the computation of a charge for the call. This data includes the date and time of the beginning of the call, its duration, the nature of the service provided during the call (voice, data, short messages, etc) and the called party number, and in the case of packet services, may include the volume of transmitted data.

Figure 2:
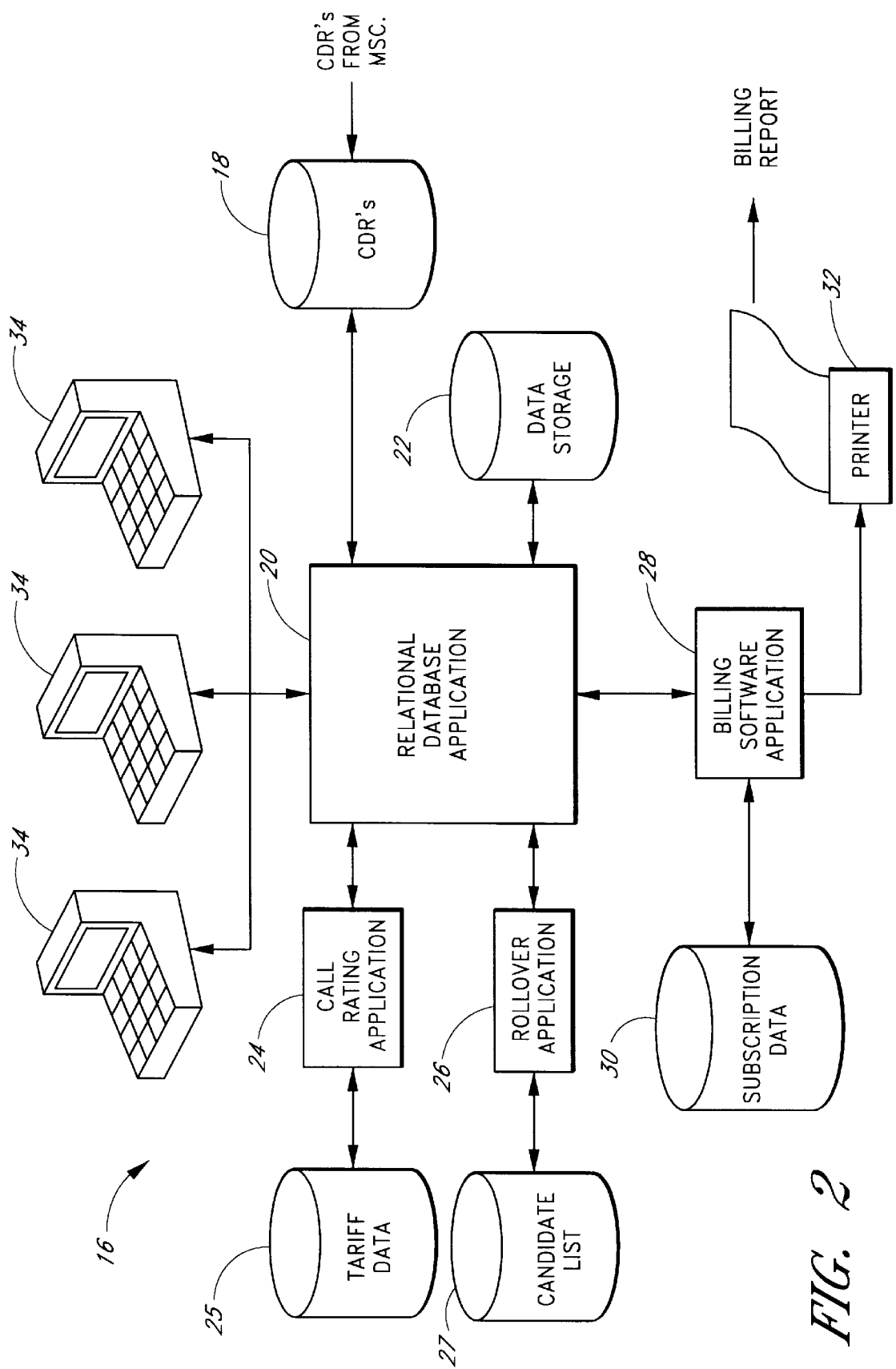
FIG. 2 is a block diagram schematically illustrating a billing centre in accordance with an embodiment of the invention.

FIG. 2 illustrates features of a billing centre in accordance with a first embodiment of the invention. The billing centre includes a call detail record logging store 18, a relational database software application 20 and its associated data store 22, a call rating software application 24 and its associated tariff data store 25, a rollover software application 26 and a candidate list store 27, a billing software application 28 and its associated subscription data store 30, and a billing report printing apparatus 32.

Each of the software applications 20, 24, 28 is implemented in an appropriate data processing means, such as a mainframe computer or a computer workstation. The data store 18 may consist of magnetic tape data storage, and/or other suitable storage media, such as hard disks. Each of the remaining data stores 20, 22, 25, 27 and 30 is preferably implemented as cache memory for fast access and retrieval.

Also connected to the relational database application 20 is a set of customer service workstations 34, allowing for on-line data input and retrieval of subscriber and account details from the relational database.

The call detail records are received continually, in batches, from each of the MSCs to which the billing centre is connected and logged in logging store 18, step 40. These logged call detail records are then periodically input in batches into the relational database 20/22.

The call detail records, once in the relational database 20/22, are then rated in order of receipt by the rating application 24, referring to the tariff store 25 to attach an appropriate charge to each call detail record. The attached charge is stored in the relational database 20/22.

The relational database 20/22 holds not only call detail records but also subscriber detail records, bundle records (to be described below) and billing account records. The relational database holds subscriber data for each subscriber including data identifying the billing account to which the subscriber belongs, a subscription type and a bundle record, if any, to be used when rating calls by the subscriber.

Figure 3:
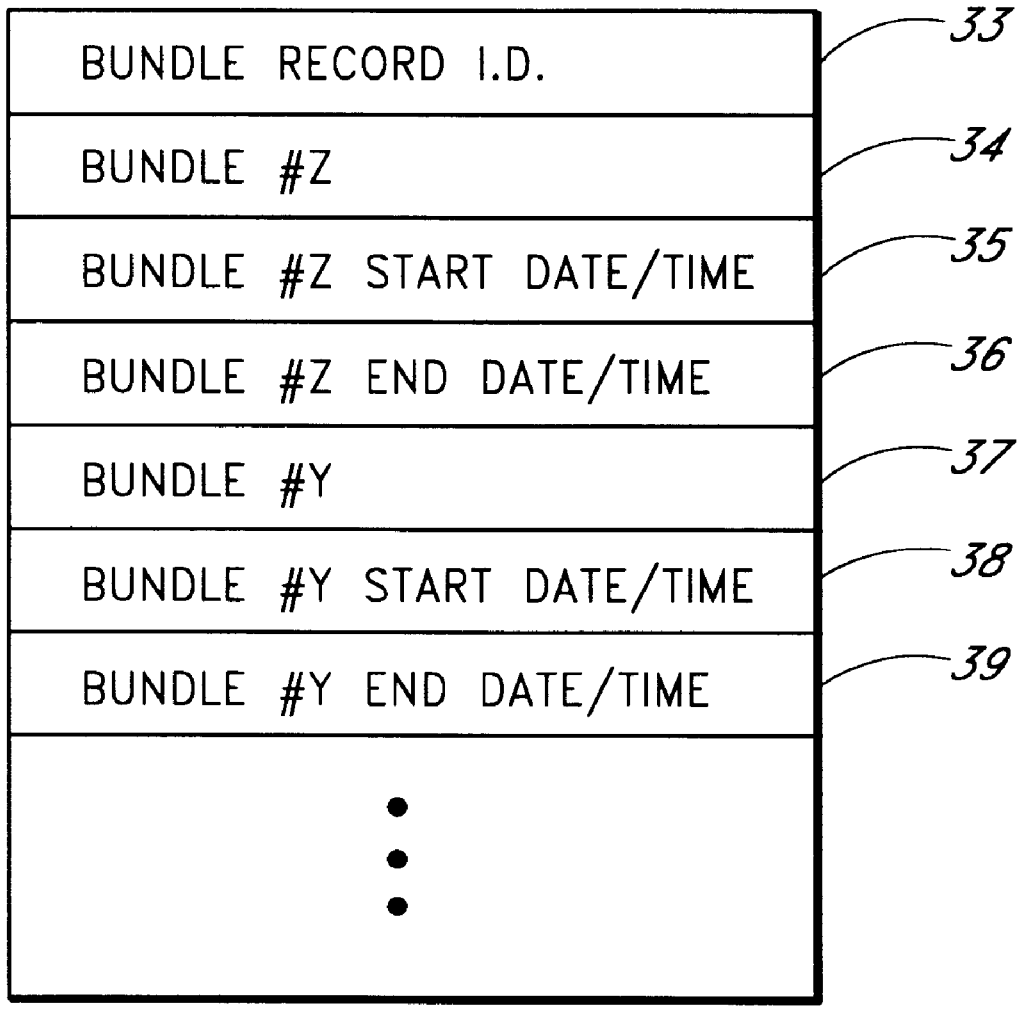
FIG. 3 is a table illustrating the contents of a bundle record held in the billing centre of FIG. 2.

FIG. 3 shows a table illustrating the contents of a bundle record. Each bundle record is assigned a unique bundle record ID 33 whereby the bundle record is accessed. The bundle record contains data relating to at least two bundles, including for example the current bundle and the previous bundle. Each bundle is an allocation of usage of a telecommunications service, and is assigned a predetermined period of currency. This period of currency corresponds with the billing period, in this embodiment one month. Thus, the latest bundle (bundle #Z) 34 in the bundle record has a predefined start date/time 35 and a predefined end date/time 36. The preceding bundle (bundle #Y) 37 also has a predefined start date/time 38 and a predefined end date/time 39. A bundle is current when the rating application 24 is rating a call which was started at a date/time which falls between the start date/time and end date/time of the bundle. Each bundle in the bundle record is consecutive, namely bundle #Z has a start date/time equal to the end date/time of bundle #Y. Further bundles preceding bundle #Y, with their associated period of currency, may also be held in the bundle record, depending on the historical extent of bundle access required by the rating application 24.

In this embodiment of the invention, the bundle consists of a duration of call time. The duration of the bundle added at the beginning of a billing period depends on the subscription type held. In the case of a single-subscriber subscription, the bundle is related to a single directory number (MSISDN) and may be used by that subscriber only. In the case of a group subscription, the bundle is related to a number of directory numbers (MSISDNs) and may be used by any subscriber in the group in part or in whole.

No call charges, or reduced call charges, are made by the network operator for usage of the bundle time, and therefore it is desirable for subscribers to utilise all of their bundle time.

Figure 4:
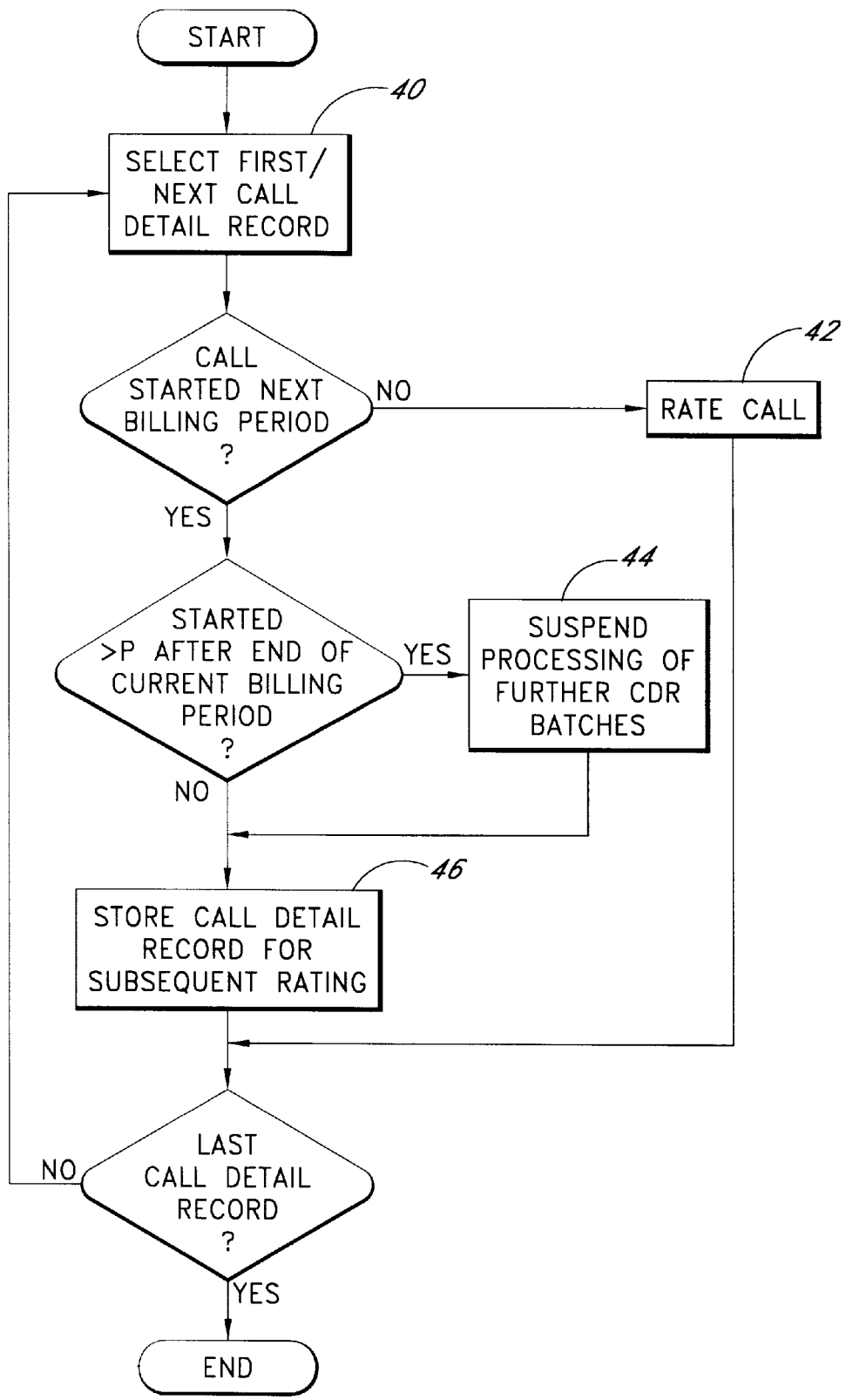
FIG. 4 is a flow diagram illustrating the rating procedure used in tis embodiment of the invention.

FIG. 4 illustrates the rating procedure carried out by the rating application 24. During rating, call detail records are rated sequentially in turn, the first call detail record available being selected initially, step 40. The call detail record is analysed to determined whether the call has a start date/time within the current billing period, and if so the call is rated, step 42.

Figure 5:
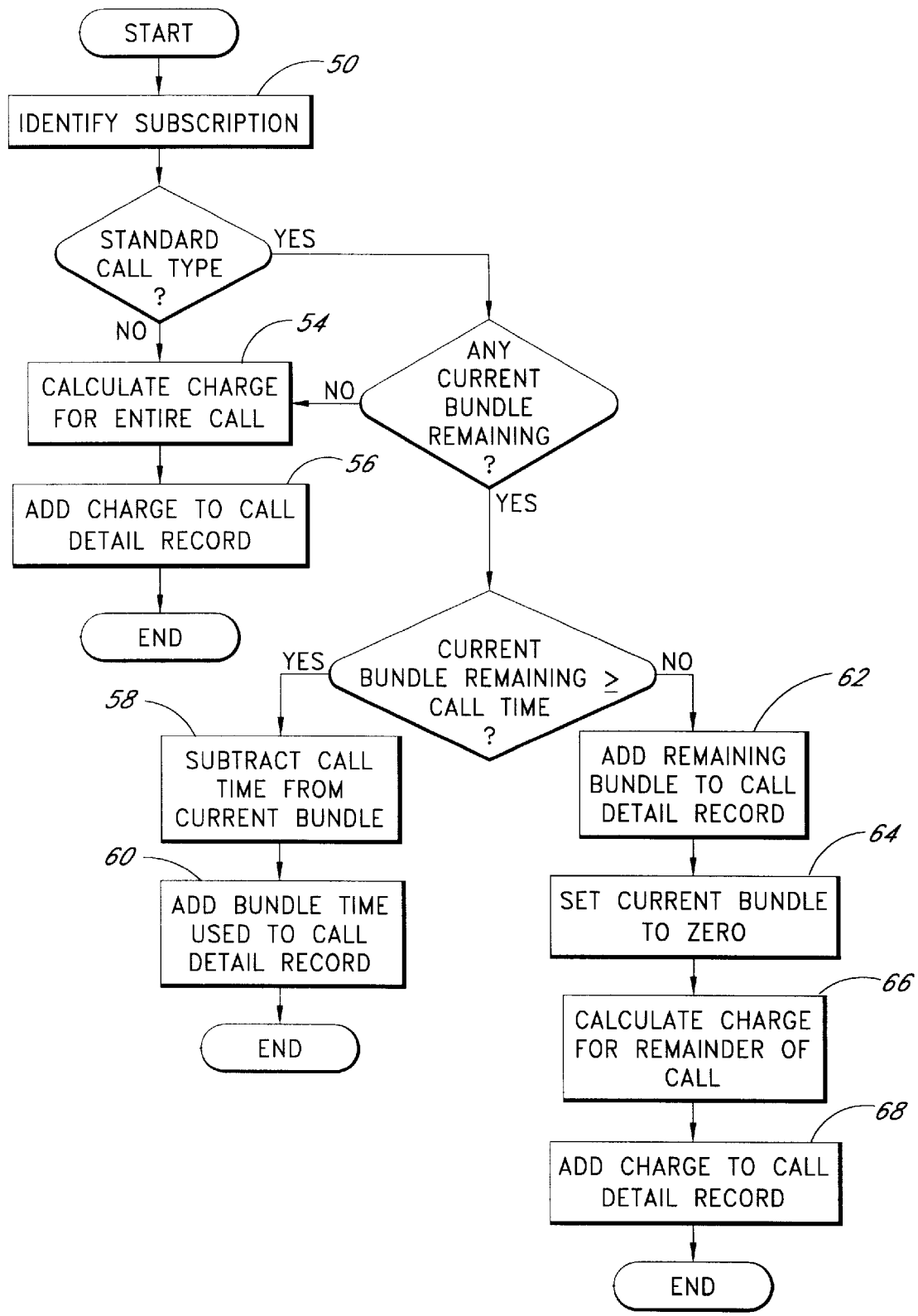
FIG. 5 is a flow diagram illustrating a procedure for rating a call record in accordance with a first embodiment of the invention.

The rating procedure for a single call detail record is illustrated in FIG. 5. The call detail record is first analysed to determine the identity of the subscriber, step 50, and then whether the call made is of a standard call type. For example, standard calls may include national fixed-line terminating calls, whereas calls made to other mobile stations, premium rate services or international calls will be treated as non-standard, since they are generally more costly.

If the call type indicated in the call detail record is non-standard, the rating application 24 proceeds to calculate a charge for the entire call, by retrieving non-standard tariff charging details held in the tariff store 26, step 54. When the charge has been calculated, data indicating the charge is added to the call detail record, 56, to allow the call to be billed at a later stage.

If in step 50 the call is identified as a standard call type, it is determined that the call duration may be subtracted from any available bundle time, rather than being charged for directly.

If the bundle record indicates that all of the bundle time originally for the current billing period has been used already, the rating application 24 proceeds to retrieve data indicating the subscription type of the subscriber from the relational database 20/22 and standard tariff charges for that subscription type from the tariff store 25, and thereby to calculate the charge for the entire call, step 54. The calculated charge is added to the call detail record, step 56.

If however there is time remaining in the current bundle, it is checked whether the bundle time remaining is greater than or equal to the duration of the call. If so, the duration of the call is subtracted from the remaining bundle time in the current bundle, step 58, and data indicating the bundle time used is added to the call detail record, step 60, for use in subsequent billing of the call. No charge is attached to the call detail record.

If the current bundle time remaining is less than the duration of the call, the remaining bundle time is subtracted from the remainder of the current bundle (then no usage allocation remains) and data is added to the call detail record indicating the bundle time subtracted, steps 62 and 64.

Next, the charge for the remaining duration of the call is calculated from the subscription type held in the relational database 20/22, and the appropriate standard charging tariff details held in the tariff store 26, step 66. Data indicating the charge to be levied is then added to the call detail record, 68, for use during subsequent billing of the call.

Returning to FIG. 4, after the end of a billing period, the rating application 24 will begin to receive call detail records from the MSCs in the network which have a start date/time subsequent to the end of the current period. On receipt of a call started after the end of the current billing period, the rating application 24 checks whether the call was started at least a time "P" after the end of the current period. The time "P" is a time duration set within the network which defines the maximum call duration allowed within a call detail record. Namely, if the serving MSC notes a call with a duration approaching the time "P", the MSC will create a "partial" call detail record covering the maximum duration "P", and create one or more further call detail records relating to the remaining duration of the call. Once the rating application has identified a call with a start date/time greater than "P" after the end of the current period, the rating application 24 suspends processing of further batches of call detail records received from the MSC from which the call detail record in question arrived. Notably, once the receipt of a call detail record relating to a call which was started greater than "P" minutes after the end of the current period, the rating application 24 has ascertained that all in-sequence call detail records with a start date/time before the end of the current period have now been received from the MSC in question.

Instead of rating a call which started after the end of the current period, the call detail record is stored for subsequent rating, step 46. Once the call detail record has been rated, or the call detail record has been stored for subsequent rating, the next detail record is rated, returning to step 40. If the call detail record is the last call detail record from the network's MSCs to be processed by the rating application 24, rating ends for the current billing period. All in-sequence call detail records relating to calls started in the current period have then been rated.

Figure 6:
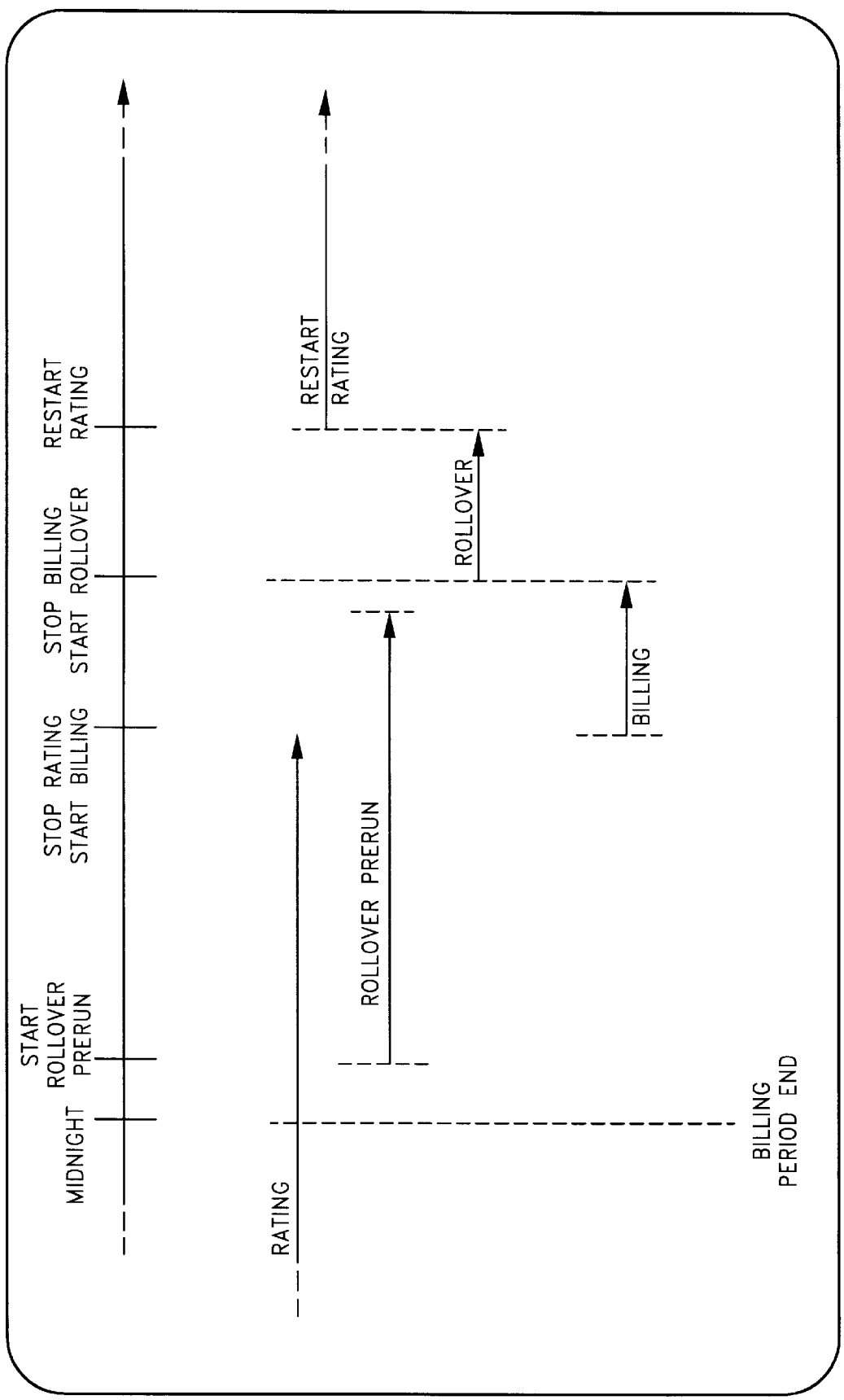
FIG. 6 is a timing diagram illustrating sequences carried out by the billing centre of FIG. 2.

FIG. 6 illustrates the timing of the procedures carried out in the billing system around a billing period, when billing is conducted off-line, i.e. rated call detail records are transferred to a dedicated billing records store before the billing process is begun. Rating continues throughout most of the billing period, and continues after the billing period end (conveniently midnight on the last day of the month). After the billing period ends, the rating application continues to rate call detail records relating to calls started before the billing period end, but received in the billing centre after the billing period end (referred to herein as "late calls"). During billing, using the subscription records held in the billing system, new bundles are created for entitled subscriptions, for use during the next billing period. Shortly after the billing period end, rollover prerun procedures, to be described below, are started by the rollover application 26, whilst the rating of the late calls continues. Once rating ends, as described in relation to FIG. 4, the rated call detail records are passed over to the billing application 28, and billing is started. Once the rollover prerun and billing have ended, rollover procedures, to be described below, are carried out by the rollover application 26. Throughout billing and rollover, rating is halted, and once rollover is completed, rating is restarted. First, the call detail records stored in step 46 are processed. Then, the queued batches containing call detail records relating to calls starting after the end of the previous billing period, and out-of-sequence call detail records relating to calls started during the previous billing period (referred to herein as "late-late calls") are rated in turn.

Figure 7:
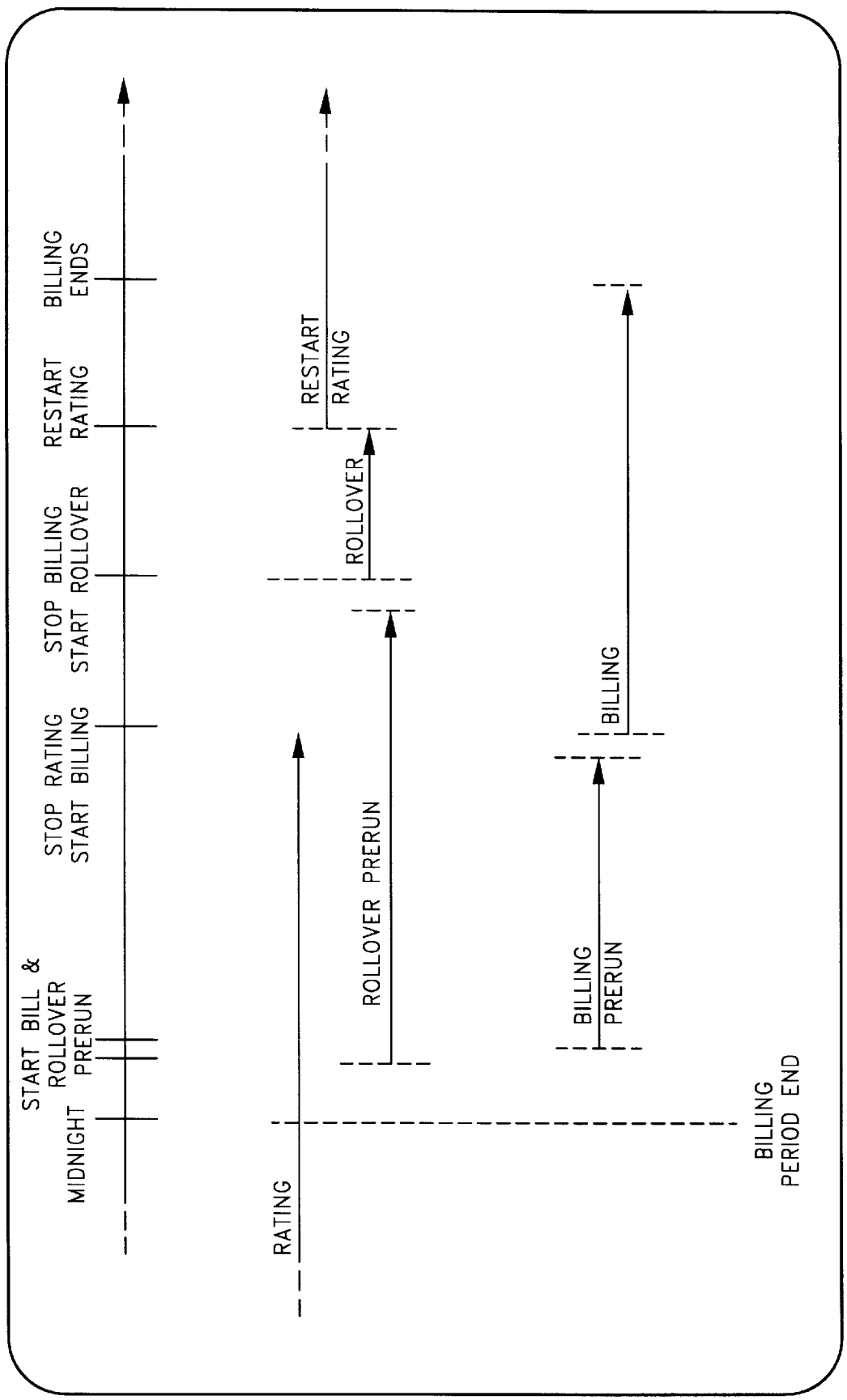
FIG. 7 is a timing diagram illustrating an alternative sequence of the procedures carried out by the billing centre of FIG. 2.

FIG. 7 illustrates an alternative timing of processes carried out by the billing centre when billing is conducted on-line, i.e. the billing application runs in parallel with the rating and rollover applications, each using the call detail records held in the relational database 20. In this embodiment, rating also continues after the end of the billing period, continuing to rate late calls. Shortly after the end of the billing period, rollover prerun procedures, to be described below, are started, and a billing prerun, carried out by the billing application 28, is also initiated. During the billing prerun all remote update and remote creates relating to the forthcoming billing period, using the subscriber information held in billing database 30, are performed, including the creation of the new bundles for entitled subscriptions for use by the rating application in the forthcoming billing period.

Once the billing prerun is completed, billing is initiated irrespective of whether rating of late calls has ended.

The rollover prerun is timed to end shortly before rating of late calls ends so that once rating of late calls ends, a rollover procedure, to be described below, may immediately be carried out. Once rollover is completed, rating is restarted to rate initially the call detail records stored in step 46, followed by the queued call detail records for calls which started after the end of the previous billing period, and for late-late calls.

Figure 8:
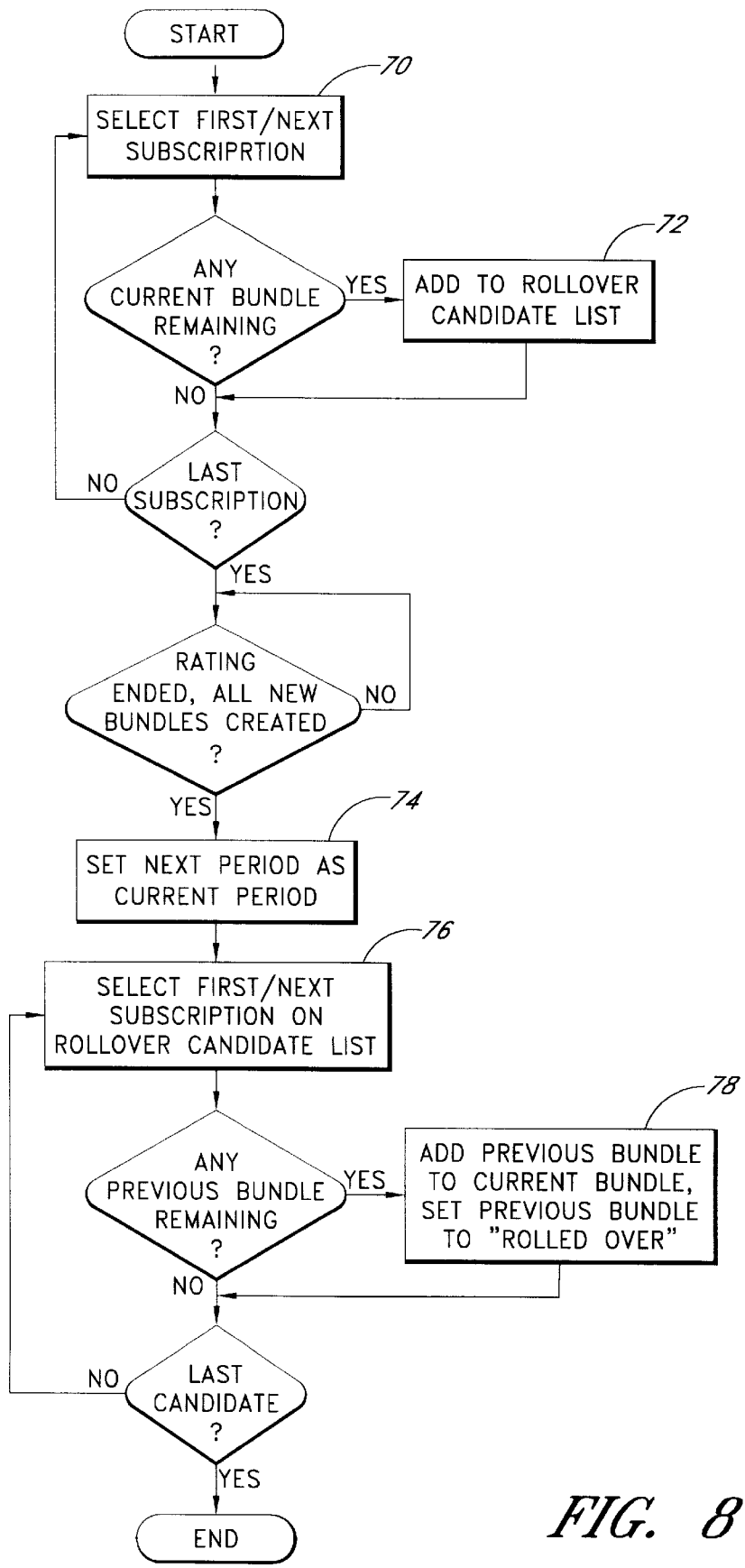
FIG. 8 is a flow diagram illustrating a rollover procedure used in this embodiment of the invention.

FIG. 8 illustrates the rollover prerun and rollover procedures mentioned in relation to FIGS. 6 and 7. The rollover process itself is used to add any remaining contents of bundles current for the previous billing period to the newly-created bundle for the next billing period, thereby to avoid loss of bundle time unused in the previous billing period. The rollover prerun is carried out in order to increase the efficiency of the rollover process, so that rating may be restarted sooner. It is desirable to minimise interruptions to rating, in order to keep the data held in the relational database 20 as up-to-date as possible. In effect, the rollover prerun excludes from consideration subscriptions for which the bundle current for the previous billing period has been used in full. In such cases, there is no time to rollover.

Referring to FIG. 8, the rollover prerun is initiated by selecting a first subscription in the relational database 20, and checking whether any current bundle (in this case, the bundle is "current" in the sense that late calls are still being rated against the bundle), step 70. If the bundle has not yet been set to zero, the subscription is added to a candidate rollover list, step 72. The shortlisting procedure is continued until the last subscription has been checked, thus ending the rollover prerun.

The rollover procedure itself cannot start until rating has ended, and until the new bundles for the forthcoming billing period have been created either in billing itself or in the billing prerun. Once rating is ended and all bundles have been created, the forthcoming billing period is set as the current period, step 74, so that bundles which were previously current become previous bundles, and the new bundles become the current bundle against which call detail records are subsequently to be rated by the rating application 24.

Next, the rollover procedure is initiated, by selecting the first subscription appearing on the candidate list generated in the rollover prerun, step 76. If, after the end of rating of late calls, any of the now previous bundle remains, the bundle time remaining is added to the newly-created current bundle. In order to avoid excess accumulation of bundle time by a subscriber, it is possible to set a limit for the amount of previous bundle rolled over. The previous bundle is also set to an invalid setting indicating that its contents have been "rolled over", step 78. Rollover continues until all subscriptions on the rollover candidate list have been processed by the rollover application 26, at which point rating is restarted using the current bundles containing bundle time rolled over from the previous billing period.

During billing, the billing details for each account are compiled, using the charges and bundle times attached to the call detail records by the rating application 24, and using other data in the call detail records retrieved by the billing application 28. The billing details include the subscription charges levied, the usage charges incurred, the amount of the subscriber's previous bundle used, the amount of bundle time rolled over to the current bundle, and individual call itemisation details indicating the date, time, duration, bundle time used, cost and terminating point for each call made during the preceding billing period.

Once the billing details have been compiled for an account, the billing details may be transmitted to the billing report printing apparatus, 32. The billing report printing apparatus 32 formats the billing details to generate an invoice for the account on one page, and a billing report including the bundle time used and rolled over and individual call itemisation report on one or more further pages. The individual call itemisation report shows the date, time, duration, bundle time used, cost and terminating point for each call made by the subscriber.

Once rating is restarted, the majority of CDRs will relate to calls started after the previous billing period end. However, some CDRs (for late-late calls), arriving out-of-sequence due to abnormal processing in the network, will also arrive for rating after the end of rollover. If a late-late call falls under the standard call category, it is possible that it should, according to the principle of rating against the bundle current at the start of the call, against the previous bundle. Once rollover has been performed, it is no longer possible to rate such standard calls (referred herein as "bundle-able") against a previous bundle which has been subject to rollover. In such rare cases, the rating application 24 generates an "invalid" code for the CDR.

Figure 9:
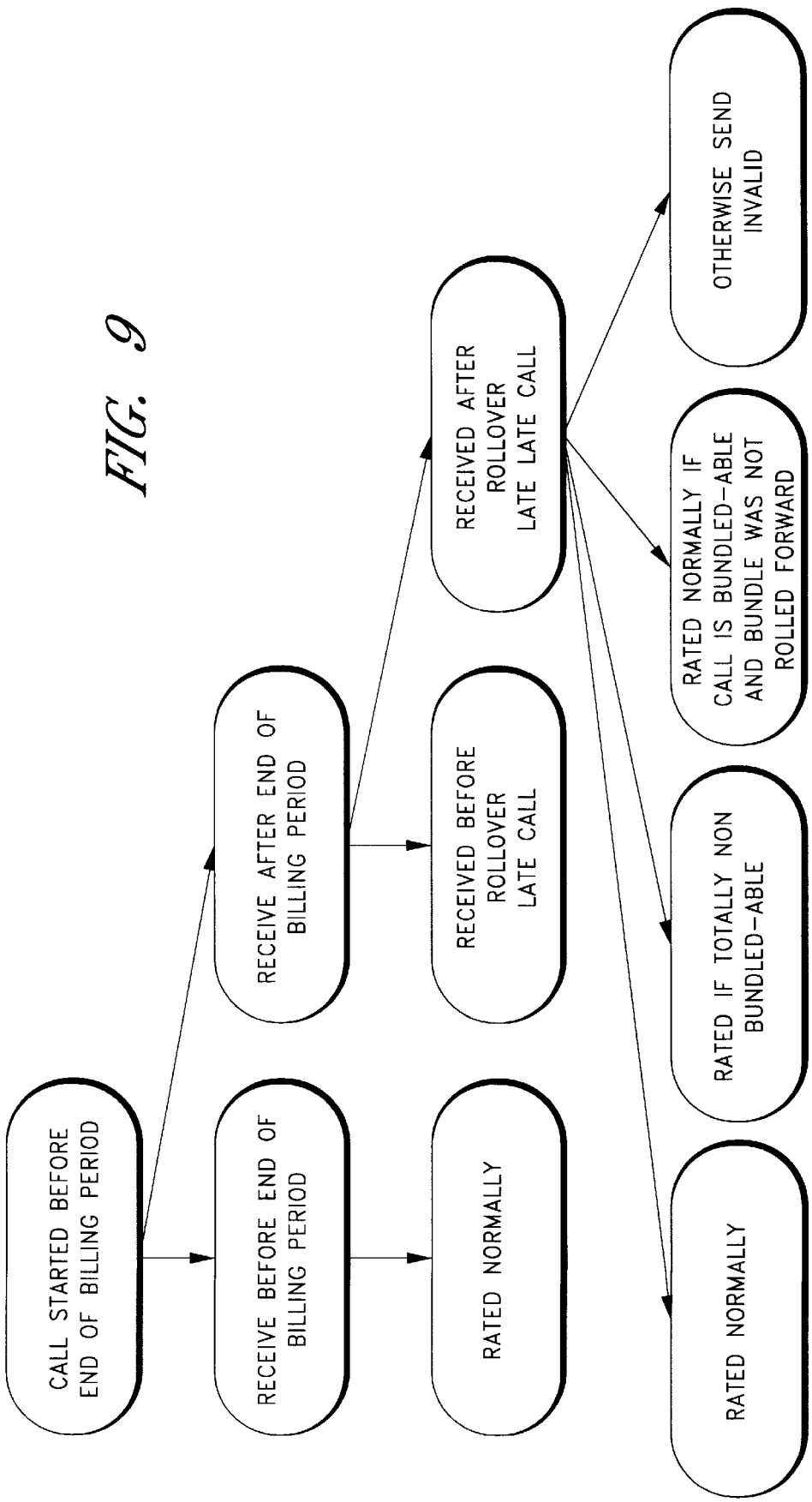
FIG. 9 is a tree diagram illustrating how calls started before the end of a particular billing period are treated by the rating system in this embodiment.

FIG. 9 is a tree diagram illustrating how calls started before the end of a particular billing period are treated in this embodiment by the rating system, in summary form.

In the above-described embodiment, specific procedures (the rollover prerun and rollover itself) are instituted in order to allow bundle time remaining at the end of rating for a billing period to be used when rating call detail records relating to calls in the next billing period. However, as mentioned above, rating is interrupted during the rollover procedures. In two further embodiments of the invention, described in relation to FIGS. 10 and 11, the ability to rate call detail records against bundle time remaining from a previous billing period is implemented without the need for a separate rollover procedure in the billing centre. In these embodiments, rating may be continued without interruption, and billing (and a billing prerun if appropriate) may be instituted any time after the end of the billing period. The billing system used in relation to these two further embodiments is similar to that illustrated in FIG. 2, with the exception that the rollover application 26 and its associated data store 27 are omitted, and a modified rating application 24 is used.

Figures 10, 10A:
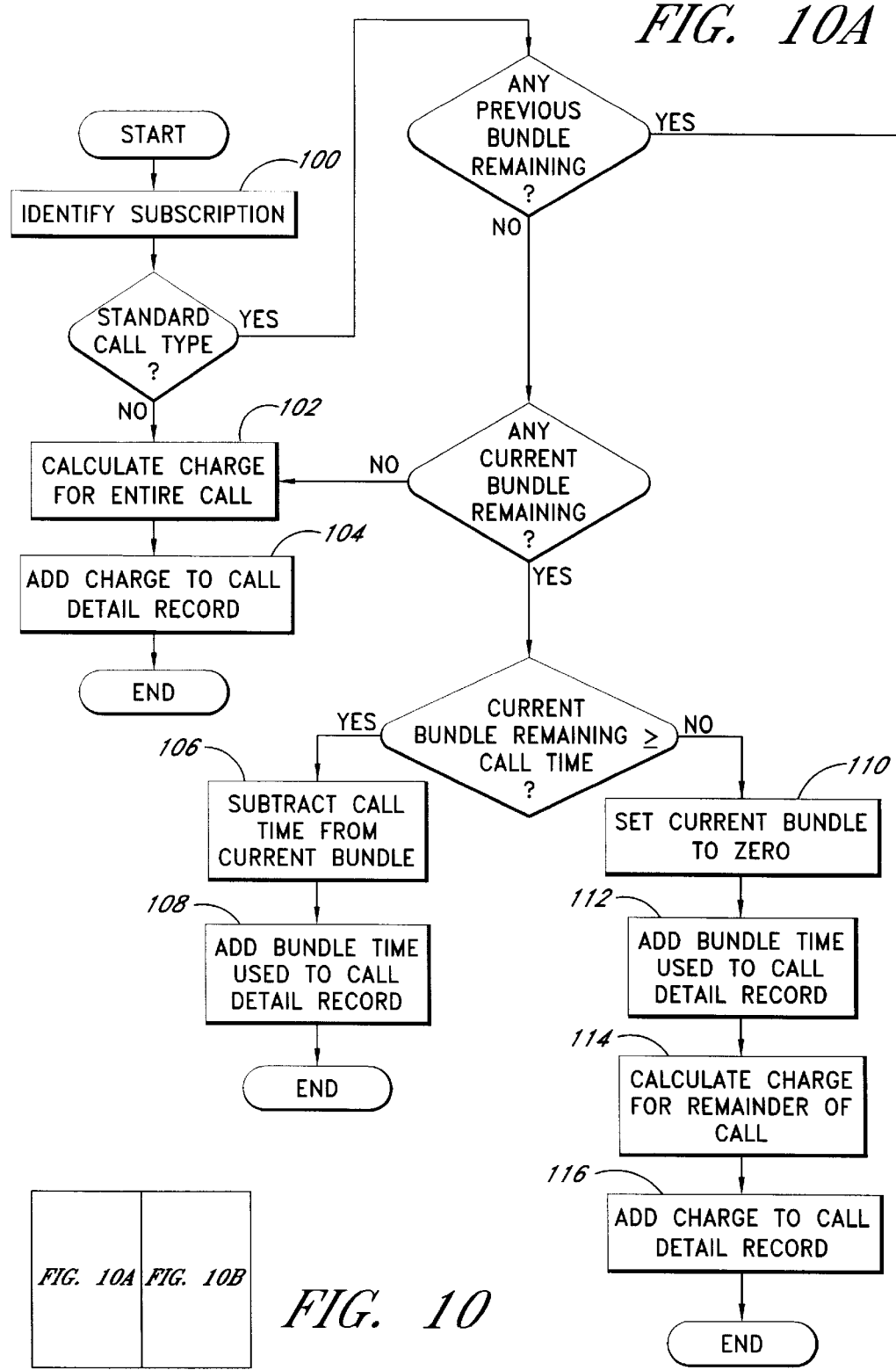
FIG. 10 is a flow diagram illustrating a call rating procedure carried out by the billing centre of a second embodiment of the invention.
Figure 10B:
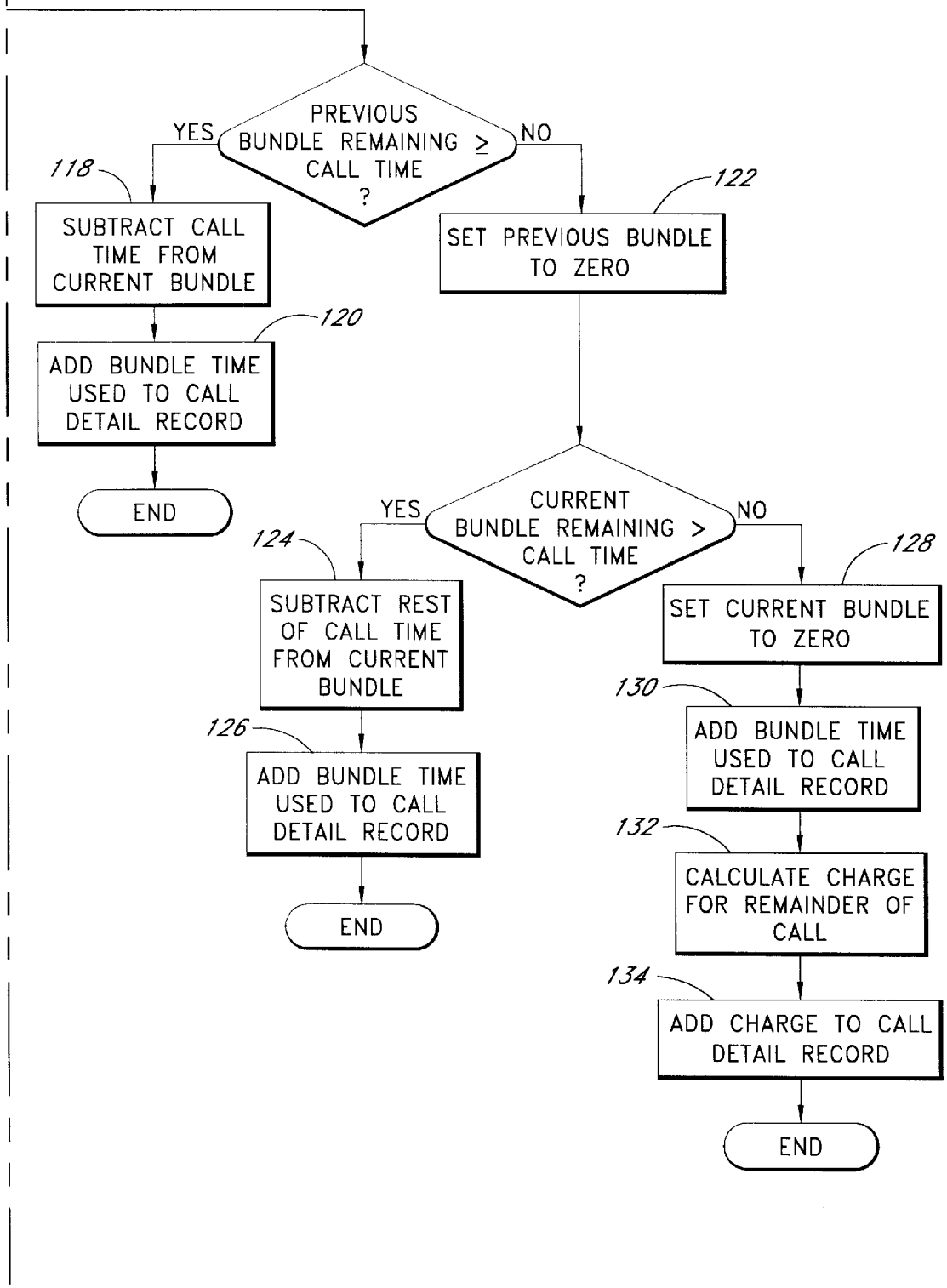

FIG. 10 illustrates the rating of a call detail record by the rating application 24, modified in accordance with the second embodiment.

Once the subscription in question has been identified, step 100, if the call is of a non-standard type, the call is rated normally, steps 102 and 104. If on the other hand the call is bundle-able, the rating application refers to the previous bundle. If the previous bundle has been fully used, the current bundle is then checked. If no current bundle remains, the call is rated normally, steps 102 and 104, to attach a charge to the call detail record. If at this point any current bundle remains, and the current bundle remaining is greater than the duration of the call, the entire call duration is subtracted from the current bundle and added to the call detail record, steps 106 and 108. If on the other hand the current bundle is insufficient to account for the entire duration of the call, the remainder of the current bundle is removed and added to the call detail record and the remainder of the call is charged to the call detail record, steps 110, 112, 114 and 116.

On the other hand, if there remains an allocation of usage within the previous bundle at the time of rating, this is used preferentially to that of the current bundle. If the amount of the previous bundle remaining is sufficient to account for the entire call time duration, the call time duration is subtracted from the previous bundle and added to the call detail record, steps 118 and 120. If the previous bundle is insufficient at this point, the remainder of the bundle is removed, step 122. If then the amount of the current bundle (which has not yet been subtracted from) is sufficient to account for the remainder of the call duration, the remainder of the call duration is subtracted from the current bundle, and the bundle time used, combined from the previous bundle and the current bundle, is added to the call detail record, steps 124 and 126. If the remainder of the call time is so great that the current bundle is insufficient, the current bundle is removed entirely, the total bundle time used is added to the call detail record and the subsequent remainder of the call as yet unaccounted for is charged, steps 128, 130, 132 and 134.

In the second embodiment, described above, any previous bundle remaining is allocated before the contents of the current bundle. The inverse applies to the third embodiment, described below in relation to FIG. 11.

Figure 11B:
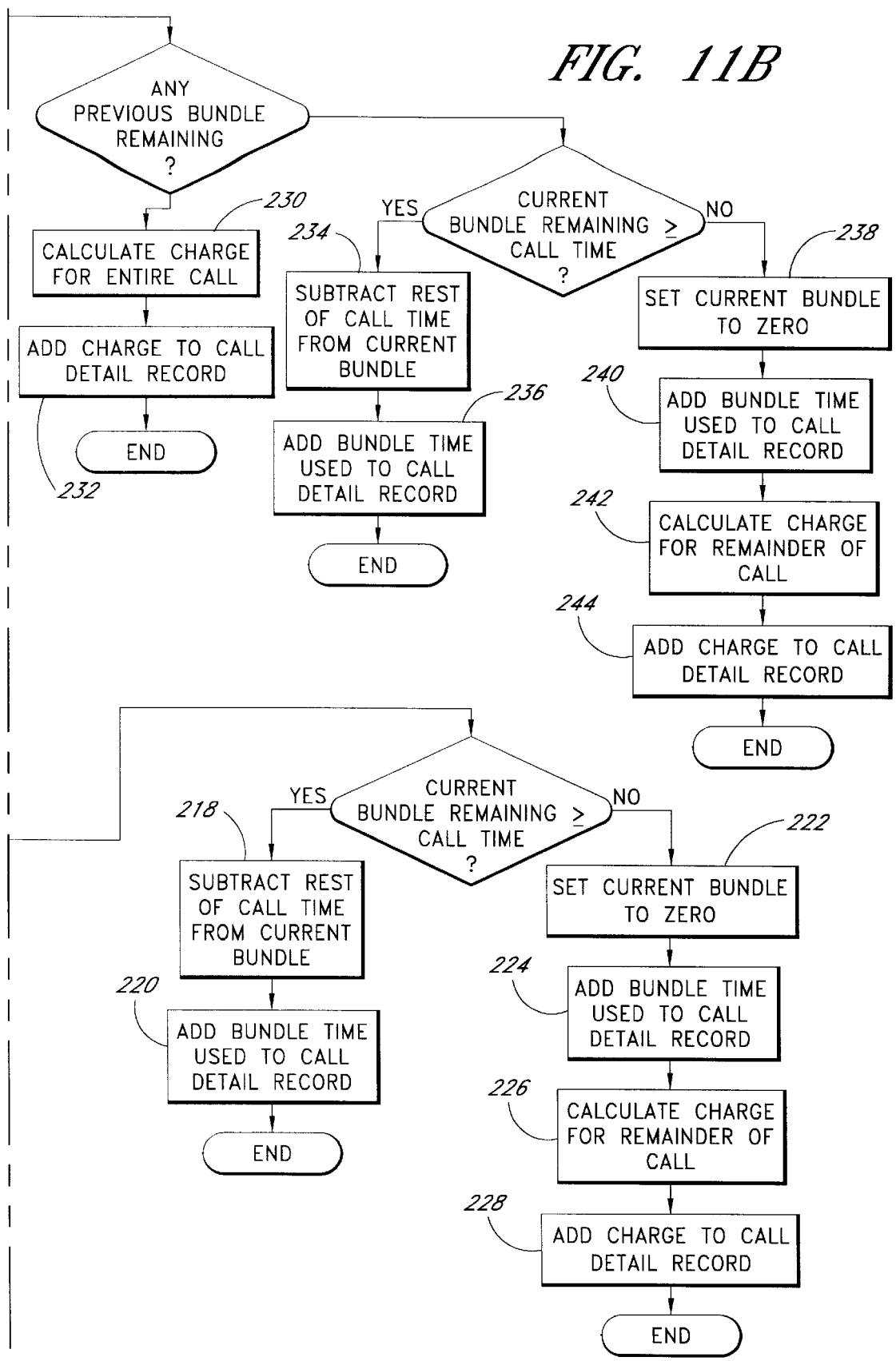
FIG. 11 is a flow diagram illustrating a call rating procedure carried out by a billing centre in accordance with a third embodiment of the invention.

Referring to FIG. 11, when a call detail record is processed by the rating application 24 according to the third embodiment, the subscription is first identified, steps 200. If the call type is non-standard, the call is rated normally, steps 202 and 204, to attach a charge to call detail records.

If the call is bundle-able, the rating application 24 checks if there is any current bundle remaining. If so, and the current bundle remaining is greater than the duration of the call, the duration is subtracted from the current bundle and added to the call detail record, steps 206 and 208. If the current bundle remaining is insufficient to account for the call time, the contents of the current bundle are subtracted, and if none of the previous bundle remains, the bundle time used is added to the call detail record, step 212, and the remainder of the call is charged to the call detail record, steps 214 and 216. If however at this stage any previous bundle remains, and if the amount of the previous bundle remaining is sufficient to account for the rest of the call time, the call time remainder is transferred from the previous bundle to the call detail record, steps 218 and 220. If however the amount of previous bundle remaining is insufficient to account for the rest of the call time, the previous bundle is set to zero, step 222, and the total bundle time used is added to the call detail record, step 224. The remainder of the call is then charged to the call detail record, steps 226 and 228.

Where the call is bundle-able, but no current bundle remains, the rating application 24 checks if any of the previous bundle remains. If not, the entire call duration is charged to the call detail record, steps 230 and 232. If however any previous bundle remains, and the previous bundle remaining is sufficient to account for the call time, the total call time is transferred from the previous bundle to the call detail record, steps 234 and 236. The remainder of the previous bundle is insufficient to account for the call time, the remainder of the previous bundle is removed and added to the call detail record, steps 238 and 240, and the remainder of the call is charged to the call detail record, steps 242 and 244.

The above-described embodiments provide means and methods allowing bundle time remaining at the end of rating for a particular billing period to be used when rating call detail records relating to calls in the next billing period, thereby avoiding loss of unused bundle time for the previous period. In addition, historical data relating to bundle usage in one or more previous periods is maintained, to allow for late-late call rating and access to such historical data. Notably, such historical record keeping would not be possible if only a single bundle, updated at the end of each billing period, were provided.

It is envisaged that various equivalents and modifications may be used in relation to the above-described embodiments, without departing from the spirit or scope of the present invention.

What is claimed is:

1. Call record processing apparatus for a telecommunications system, said apparatus comprising:
   an input data link for receiving call records generated in the telecommunications system;
   a store for user allocation records, said user allocation records being capable of holding first allocations of usage associated with first predetermined usage criteria and second allocations of usage associated with second predetermined usage criteria, at least one criterion of which is different to any of said first criteria,
   a call record processor arranged to cumulatively reduce one of said first allocations for call records holding call details satisfying said first criteria, and to cumulatively reduce one of said second allocations for call records holding call details satisfying said second criteria,
   wherein said apparatus is arranged to associate said first allocations with said second allocations so as to allow said call record processor to reduce one of said first allocations for call records holding call details satisfying said second criteria.

2. Apparatus according to claim 1, wherein said at least one criterion includes a temporal currency limit.

3. Apparatus according to claim 2, wherein said first criteria include a first temporal currency period.

4. Apparatus according to claim 3, wherein said at least one criterion includes a second temporal currency period.

5. Apparatus according to claim 4, wherein said first period precedes said second period.

6. Apparatus according to claim 5, wherein aid second period starts immediately at the end of said first period.

7. Apparatus according to claim 1, wherein said allocations are durations of service usage.

8. Apparatus according to claim 7, wherein said call record processor is arranged to attach the amount whereby at least one of said usage allocations is reduced for a call record holding call details satisfying said first or second criteria.

9. Apparatus according to claim 1, wherein said first and said second criteria include call type criteria.

10. Apparatus according to claim 9 comprising a tariff store, and
   wherein said call processor is arranged to attach a charge, calculated with reference to said tariff store, to a call record holding call details not satisfying said call type criteria.

11. Apparatus according to claim 1, wherein said call record processor is arranged to reduce one of said first and one of said second allocations for a call record holding call details satisfying said second criteria, where the amount remaining of said first or said second allocation alone is insufficient to account for the service usage detailed in said call record.

12. Service usage processing apparatus for a telecommunications service, said apparatus comprising:

a store holding user records; and a service usage processor, said apparatus being arranged to associate a predetermined allocation of usage with a user record, at the start of each of a plurality of consecutive usage periods, said allocation having a defined period of currency corresponding to the following usage period, such that a first allocation is associated with a user record for a first usage period and a second allocation is associated with said user record for a second usage period, said service usage processor being arranged to reduce said first allocation for service usage defined to occur within said first usage period, and to reduce said second allocation for service usage defined to occur within said second usage period, wherein said service usage processor is arranged to reduce said first allocation for service usage defined to occur within said second usage period, if at least a portion of said first allocation remains after the end of said first usage period.

13. Apparatus according to claim 12, wherein said user records each identify one of a plurality of predetermined subscription types, each said type being associated with a different said predetermined allocation.

14. A method of operating a rating apparatus in a telecommunications system, said method comprising the following steps:

(i) defining, for subscriptions in the system, first usage allocations to be applied by said apparatus to service usage during a first usage period;

(ii) rating usage records during said first usage period, reducing said first usage allocations for predefined usage types;

(iii) interrupting rating after the end of said first usage period;

(iv) defining second usage allocations to be applied by said apparatus during a second usage period; and (v) adding remaining usage from said first allocations to said second allocations whilst call rating is interrupted.

15. A method according to claim 14, said method comprising continuing step (ii) after the end of said first usage period until receipt of a usage record having predetermined characteristics.

16. A method according to claim 14, comprising continuing step (ii) until at least a predetermined length of time, corresponding to a maximum usage duration allowed in a usage record by said system, elapses after the end of the first usage period.

17. A method according to claim 14, comprising conducting a preliminary to step (v) during step (ii), said preliminary comprising identifying a candidate list of subscriptions having first usage allocations remaining before rating is interrupted.

18. A method according to claim 14, comprising restarting rating after step (v), reducing said second usage allocations for said predefined usage types.

19. A method of operating a rating apparatus in a telecommunications system, said method comprising the following steps:

(i) defining, for subscriptions in the system, first usage allocations to be applied by said apparatus to service usage during a first usage period, and second usage allocations to be applied by said apparatus during a second usage period;

(ii) rating usage records detailing usage defined to occur during said first usage period against said first usage allocations; and (iii) rating usage records detailing usage defined to occur during said second usage period against both said first and said second usage allocations.

20. A method according to claim 19, said method comprising storing, for a particular subscription, said first usage allocation in a first allocation record and said second usage allocation in a second allocation record, and wherein step (iii) includes, when a usage record details usage by said particular subscription, applying said usage against said first and said second allocation records in accordance with predetermined prioritisation algorithm.

21. A method according to claim 20, comprising attempting to apply said usage against said first allocation record first.

22. A method according to claim 20, comprising attempting to apply said usage against said second allocation record first.

* * * * *